United States Patent
Høj et al.

(10) Patent No.: US 11,034,779 B2
(45) Date of Patent: Jun. 15, 2021

(54) AMIDE AND IMIDE PHOTOINITIATORS

(71) Applicant: Coloplast A/S, Humlebaek (DK)

(72) Inventors: Carsten Høj, Slangerup (DK); Niels Joergen Madsen, Alleroed (DK); Petr Sehnal, York (GB); David Jepson, Harrogate (GB); Andrew Towns, Leeds (GB)

(73) Assignee: Coloplast A/S, Humlebaek (DK)

( * ) Notice: Subject to any disclaimer, the term of this patent is extended or adjusted under 35 U.S.C. 154(b) by 0 days.

(21) Appl. No.: 16/639,134

(22) PCT Filed: Aug. 16, 2018

(86) PCT No.: PCT/DK2018/050198
§ 371 (c)(1),
(2) Date: Feb. 14, 2020

(87) PCT Pub. No.: WO2019/034221
PCT Pub. Date: Feb. 21, 2019

(65) Prior Publication Data
US 2020/0231715 A1    Jul. 23, 2020

(30) Foreign Application Priority Data
Aug. 17, 2017  (DK) .......................... PA 2017 70622

(51) Int. Cl.
| | | |
|---|---|---|
| C08F 2/46 | (2006.01) | |
| C08F 2/50 | (2006.01) | |
| C08G 61/04 | (2006.01) | |
| C08F 8/32 | (2006.01) | |
| C08F 8/48 | (2006.01) | |
| C08F 216/18 | (2006.01) | |
| C08F 218/02 | (2006.01) | |
| C08F 222/06 | (2006.01) | |
| C08F 222/38 | (2006.01) | |
| C08F 222/40 | (2006.01) | |

(52) U.S. Cl.
CPC .............. *C08F 2/50* (2013.01); *C08F 8/32* (2013.01); *C08F 8/48* (2013.01); *C08F 216/18* (2013.01); *C08F 218/02* (2013.01); *C08F 222/06* (2013.01); *C08F 222/38* (2013.01); *C08F 222/40* (2013.01); *C08F 2800/10* (2013.01)

(58) Field of Classification Search
CPC .... C08F 222/36; C08F 222/38; C08F 222/40; C08F 222/06; C08F 222/404; C08F 2/50; C08F 8/32; C08F 8/48; C08F 216/18; C08F 218/02; C08F 2800/10
USPC ..................................... 522/96, 90, 1; 520/1
See application file for complete search history.

(56) References Cited

U.S. PATENT DOCUMENTS 4,861,916 A    8/1989    Kohler et al.

FOREIGN PATENT DOCUMENTS

| WO | 0214382 A1 | 2/2002 |
| WO | 2013156053 A1 | 10/2013 |

OTHER PUBLICATIONS

Knaus et al, Photoinitiators with Functional Groups. III. Water-soluble photoinitiators containing carbohydrate residues, 1995, Journal of POlymer Science: Part A: Polymer Chemstry, vol. 33, 929-939 (Year: 1995).*

* cited by examiner

*Primary Examiner* — Jessica Whiteley
(74) *Attorney, Agent, or Firm* — Coloplast Corp., Coloplast A/S; Nick Baumann

(57) ABSTRACT

Polymers are provided, in which a pendant photoinitiator moiety is linked to the polymer structure via an amide or a succinimide.

28 Claims, 1 Drawing Sheet

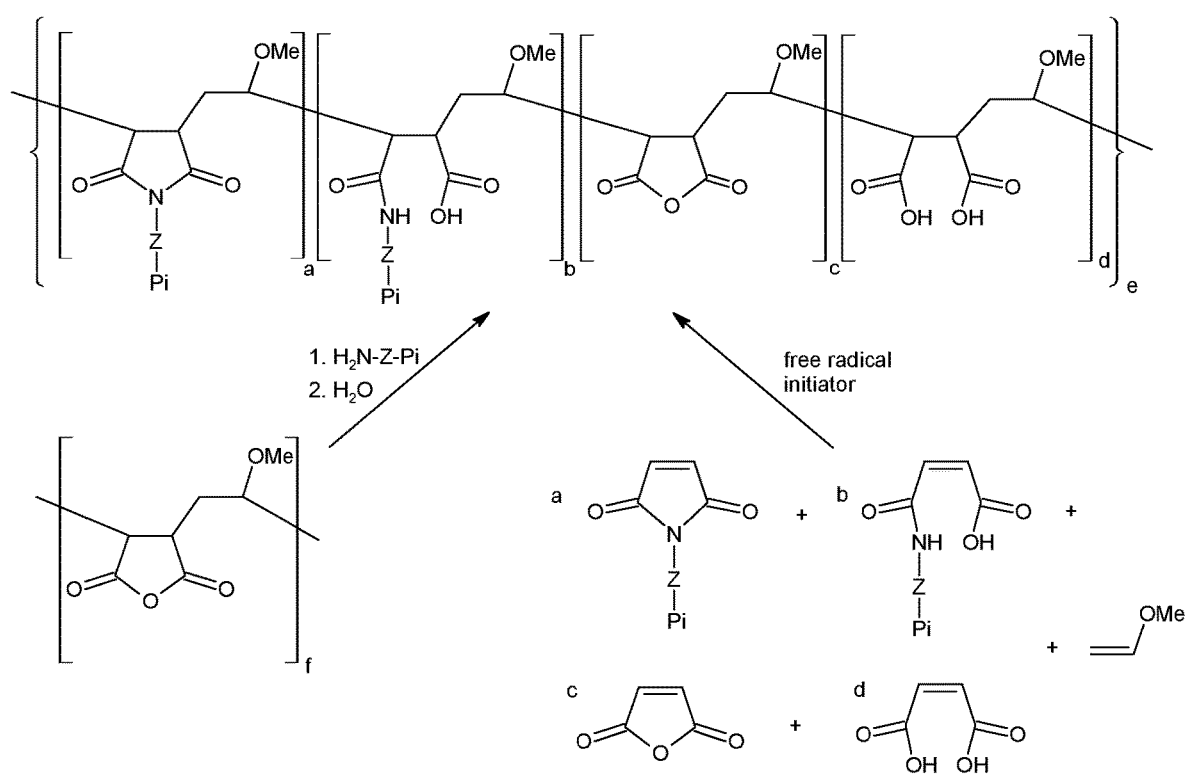

AMIDE AND IMIDE PHOTOINITIATORS

SUMMARY

The present invention relates to polymers having an amide (—CO—N—) and/or an imide (—CO—N—CO—) functionality, with a pendant photoinitiator moiety. The polymers can be readily synthesised and are stable in acidic environments.

BACKGROUND

Curing via ultraviolet (UV) radiation requires efficient methods of initiating the chemical reaction responsible for the curing process. Photoinitiators convert radiation into chemical energy, and are employed in many cases to promote curing of various materials.

Acidic polymers can have a number of advantageous properties. However, the acidic nature of these polymers places demands on the chemical stability of the polymers themselves.

Careful consideration therefore needs to be made in the design of acidic polymers.

SUMMARY

Despite previous efforts, there remains a need for novel polymers which can be easily synthesised, and which are chemically and physically stable, especially in acidic environments.

A polymer is provided which comprises one or more units of the general formula (I) and/or one or more units of the general formula (II):

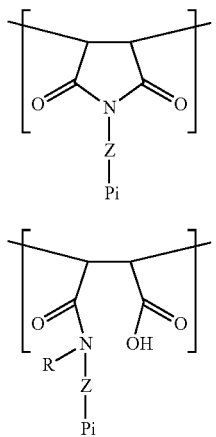

in which:
Pi is a photoinitiator moiety;
R is a hydrogen atom or optionally substituted C1-C6 alkyl or optionally substituted C6-C10 aryl;
Z is a linker moiety selected from a single bond, optionally substituted $C_1$-$C_{12}$ alkylene, optionally substituted $C_1$-$C_{12}$ alkenylene; —O—; —S—; —$NR^a$—; —CO—$NR^a$—; optionally substituted heterocyclyl; optionally substituted arylene; optionally substituted —[O—($C_1$-$C_{12}$ alkylene)]$_{n-}$, optionally substituted —[$NHR^1$—($C_1$-$C_{12}$ alkylene)]$_n$; optionally substituted —[S—($C_1$-$C_{12}$ alkylene)]$_{n-}$; and combinations thereof; wherein n is an integer from 1-20, and wherein $R^a$ is H or optionally substituted $C_1$-$C_6$ alkyl.

Polymers incorporating repeating units having the general formula (I) or (II) avoid potentially acid-sensitive groups, in particular esters in the Z-linker. A method for synthesising the polymers is also provided.

Further aspects are presented in the following description and dependent claims.

FIGURES

FIG. 1 shows possible synthetic routes to polymers described herein. In route 1, a polymer containing succinic anhydride functional groups is reacted with an amine-functionalised photoinitiator in an ethereal solvent such as tetrahydrofuran. If a primary amine is used, the resulting amide functional groups may react with adjacent carboxylic acid groups to give cyclic imides. Unreacted succinic anhydride units are then hydrolysed by the addition of water. In route 2, an alternating co-polymer is prepared via the radical-induced co-polymerisation of electron-rich and electron-deficient alkenes. The reaction is commonly carried out in aromatic hydrocarbon solvents such as toluene, and in the presence of a free radical initiator such as 2,2'-azobis(2-methylpropionitrile) or benzoyl peroxide.

DETAILED DISCLOSURE

Definitions

In the following, when a part of a molecule is described as "optionally substituted" it is meant that said part may be substituted by one or more substituents selected from: $C_1$-$C_6$ linear, branched or cyclic alkyl, aryl, —OH, —CN, halogens, amines, amides, alcohols, ethers, thioethers, sulfones and derivatives thereof, sulfoxides and derivatives thereof, carbonates, isocyanates, nitrates and acrylates. Notably, when Z is $C_1$-$C_{12}$ alkylene substituted with a $C_1$-$C_6$ alkyl substituent, said $C_1$-$C_6$ alkyl substituent may form one or more rings with the photoinitiator moiety Pi.

The term "heterocyclyl" means a non-aromatic saturated monocyclic or multicyclic ring system comprising about 3 to about 10 ring atoms, preferably about 5 to about 10 ring atoms, in which one or more of the atoms in the ring system is an element other than carbon, for example nitrogen, oxygen or sulfur, alone or in combination. Preferred heterocyclyls contain about 5 to about 6 ring atoms. The prefix aza, oxa or thia before the heterocyclyl root name means that at least a nitrogen, oxygen or sulfur atom respectively is present as a ring atom. The heterocyclyl can be optionally substituted as described above. The nitrogen or sulfur atom of the heterocyclyl can be optionally oxidized to the corresponding N-oxide, S-oxide or S,S-dioxide. Non-limiting examples of suitable monocyclic heterocyclyl rings include piperidyl, pyrrolidinyl, piperazinyl, morpholinyl, thiomorpholinyl, thiazolidinyl, 1,3-dioxolanyl, 1,4-dioxanyl, tetrahydrofuranyl, tetrahydrothiophenyl, tetrahydrothiopyranyl, and the like.

The term "alkylene" is used in the following to specify moieties derived from alkanes in which two H atoms have been removed to form a diradical species. The simplest alkylene is methylene —$CH_2$—, and other alkylenes include ethylene —$CH_2$—$CH_2$—, propylene —$C_3H_6$— and butylene —$C_4H_8$—. The term "alkylene" includes branched, linear and cyclic alkylenes, with branched alkylenes being most preferred. An alkylene which is a $C_1$-$C_{12}$ alkylene is one which contains between 1 and 12 carbon atoms. Preferred alkylenes contain between 1 and 6 carbon atoms (i.e. $C_1$-$C_6$ alkylenes).

The term "alkenylene" is used in the following to specify moieties derived from alkenes in which two H atoms have been removed to form a diradical species. Examples include ethyenylene —CH$_2$=CH$_2$— and propenylene —C$_3$H$_4$— moieties. The term "alkenylene" includes branched, linear and cyclic alkenylene, with linear alkenylene being most preferred.

The terms "aryl" or "arylene" are used to define an unsaturated cyclic system which contains a delocalised π-electron system about the ring. Aryl or arylene groups may comprise from 4-12 atoms, suitably from 6-8 atoms, most suitably 6 atoms. "Aryl" is preferably phenyl (—C$_6$H$_5$). Arylene is used to define a disubstituted aryl moiety, and is preferably phenylene.

The terms "aryl" or "arylene" in the present invention is also used to include unsaturated heterocycles—rings in which one or more atoms in the ring (e.g. 1-3 atoms) are N, S, P or O. Such heterocycles include pyrrole, furan, thiophene, imidazole, imidazoline, pyrazole, pyrazoline, oxazole, oxazoline, isoxazole, isoxazoline, thiazole, thiazoline, isothiazole, isothiazoline (5-membered rings), pyridine, pyran, thiopyran (6-membered rings).

The term "aryl" also includes fused ring systems and biaryl (particularly biphenyl) systems.

Curing

Curing is primarily initiated by exposing the substances to high energy irradiation, preferably UV light. The photoinitiated process takes place by methods which are known per se, through irradiation with light or UV irradiation in the wavelength range from 100 to 500 nm. Irradiation sources which may be used are sunlight or artificial lamps or lasers. Mercury high-pressure, medium pressure or low-pressure lamps and xenon and tungsten lamps, for example, are advantageous. Similarly, excimer, solid-state and diode-based lasers are advantageous. Diode-based light sources in general are advantageous for initiating the chemical reactions.

The ultraviolet spectrum is divided into A, B and C segments where UV A extend from 400 nm down to 315 nm, UV B from 315 to 280 nm, and UV C from 280 to 100 nm. By using a light source that generates light with wavelengths in the visible region (400 to 800 nm) some advantages are obtained with respect to the depth of the curing, provided that the photoinitiator can successfully cure the material at these wavelength. In particular, scattering phenomena are less pronounced at longer wavelength, thus giving a larger penetration depth in the material. Thus photoinitiators which absorb, and can induce curing, at longer wavelength are of interest. By judicially choosing substituents on the photoinitiator moieties, the absorption spectrum of the photoinitiator can to some extent be red-shifted, which would then facilitate curing at comparatively greater depths.

Photoinitiators and Photoinitiator Moieties

Provided is a polymer comprising one or more units of the general formula (I) and/or one or more units of the general formula (II):

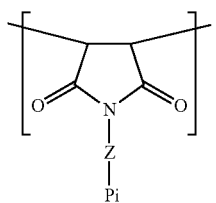

(I)

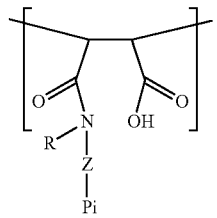

(II)

The units of formulas (I) and (II) suitably repeat within the polymer, i.e. there are suitably more than one of said units in said polymer. In one aspect, said polymer comprises units with formula (I) and units with formula (II).

When more than one repeating unit of formula (I) and/or (II) are present, they may be adjacent one another, or separated by other, different repeating units. Further details of other repeating units are given below.

In formula (II), R is a hydrogen atom or optionally substituted C1-C6 alkyl or optionally substituted C6-C10 aryl. If R is H, formation of the more stable succimimide structure (Formula I) is possible. If R is not H, stable, sterically-hindered amides can be obtained.

In formulas (I) and (II), Pi is a photoinitiator moiety. A photoinitiator is defined as a substance (other than a reactant) which, on absorption of light, generates reactive species (ions or radicals) and initiates one or several chemical reactions or transformation. One preferred property of the photoinitiator is good overlap between the UV light source spectrum and the photoinitiator absorption spectrum. Another desired property is a minor or no overlap between the photoinitiator absorption spectrum and the intrinsic combined absorption spectrum of the other components in the matrix. Good compatibility of the photoinitiator in the matrix of material to be cured is also a property of interest.

The photoinitiators with the general formula (I) and (II)s comprise a photoinitiator moiety, Pi, which provides the photoinitiators with the required response to UV radiation.

The photoinitiator moieties of the invention are efficient in transforming light from the UV or visible light source to reactive radicals which can abstract hydrogen atoms and other labile atoms from other molecules.

Radical photoinitiator moieties can be classified as either cleavable (Norrish type I reaction) or non-cleavable. Upon excitation, Norrish Type-I photoinitiator moieties spontaneously break down into two radicals. In one aspect, the photoinitiator moiety is a Norrish Type-I photoinitiator moiety.

Photoinitiator moieties (Pi) in Formula (I) and (II) may be selected from, but not exclusively restricted to, the group consisting: benzoin ethers, 1-phenyl-2-hydroxy-2-alkyl ketones, 1-phenyl-2-amino-2-alkyl ketones, benzophenones, thioxanthones, xanthones, acridones, anthraquinones, fluorenones, dibenzosuberones, benzils, benzil ketals, acetophenones, α-alkoxy-acetophenones, α,α-dialkoxy-acetophenones, α-hydroxy-α-alkyl-phenones, α-hydroxy-α,α-dialkyl-phenones, alkyl phenylglyoxylates, camphorquinones, acyl-phosphine oxides, and phenyl ketocoumarins.

Of these, preferred photoinitiator moieties are selected from acetophenones, α-alkoxy-acetophenones, α,α-dialkoxy-acetophenones, α-hydroxy-α-alkyl-phenones, α-hydroxy-α,α-dialkyl-phenones, and alkyl phenylglyoxylates.

In particular, Pi may be a Norrish Type-I photoinitiator moiety having the general formula (V):

—(Ph)—(X)$_m$      (V)

wherein Ph is an optionally-substituted phenyl ring;
wherein m is an integer of 1-5, such that m X moieties may be present at any position on Ph;
and wherein X is selected from

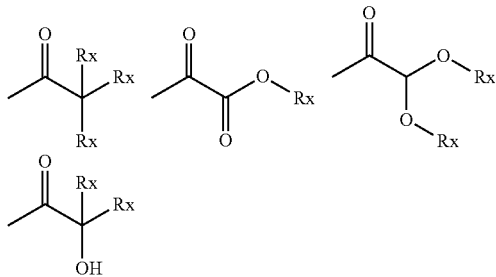

in which Rx is selected from H or optionally substituted $C_1$-$C_6$ alkyl.

In general formula (V), X is suitably present at the para-position on Ph. Suitably, m is 1 or 2, preferably 1.

Linker, Z

The portion of Formula (I) and (II) indicated by Z is a linker. Linker Z therefore has two ends. At one end, therefore, Z is joined to the photoinitiator moiety Pi; at the other end, Z is joined to the amide/imide functionality.

The size of the linker Z is selected according to the desired properties of the photoinitiator. Suitably, the linker Z has a molecular weight of less than 10000 Da, suitably less than 5000 Da, most suitably less than 1000 Da. The linker Z preferably comprises no more than 50 atoms, preferably no more than 30 atoms.

In the photoinitiators of Formula (I)/(II) above, Z is a linker. Z is a linker moiety selected from a single bond, optionally substituted $C_1$-$C_{12}$ alkylene, optionally substituted $C_1$-$C_{12}$ alkenylene; —O—; —S—; —NR$^a$—; —CO—NR$^a$—; optionally substituted heterocyclyl; optionally substituted arylene; optionally substituted —[O—($C_1$-$C_{12}$ alkylene)]$_{n-}$, optionally substituted —[NHR$^1$—($C_1$-$C_{12}$ alkylene)]$_{n-}$; optionally substituted —[S—($C_1$-$C_{12}$ alkylene)]$_{n-}$; and combinations thereof; wherein n is an integer from 1-20, and wherein R$^a$ is H or optionally substituted $C_1$-$C_6$ alkyl. The definition of Z excludes ester moieties, which may be susceptible to cleavage under e.g. acidic conditions. Additionally, provision of a 5-membered succinimide functionality, as per Formula (I), also improves chemical stability.

Suitably, n is an integer from 1-10, more suitably from 1-5, such as e.g. 1, 2, 3, 4 or 5.

In particular embodiments, linker Z may have the structure:

—C(R$^3$)(R$^4$)—Za— in which the —C(R$^3$)(R$^4$)— moiety is linked to the N-atom in formula (I) or (II);
wherein Za is a linker moiety selected from a single bond, optionally substituted $C_1$-$C_{12}$ alkylene, optionally substituted $C_1$-$C_{12}$ alkenylene; —O—; —S—; —NR$^a$—; —CO—NR$^a$—; optionally substituted heterocyclyl; optionally substituted arylene; optionally substituted —[O—($C_1$-$C_{12}$ alkylene)]$_{n-}$, optionally substituted —[NHR$^1$—($C_1$-$C_{12}$ alkylene)]$_{n-}$; optionally substituted —[S—($C_1$-$C_{12}$ alkylene)]$_{n-}$; and combinations thereof; wherein n is an integer from 1-20, and wherein R$^a$ is H or optionally substituted $C_1$-$C_6$ alkyl;

$R^3$ and $R^4$ are independently selected from H or optionally substituted $C_1$-$C_6$ alkyl; wherein $R^3$ or $R^4$, or a part thereof, may be linked to Za to form one or more ring structures. $R^3$ and $R^4$ may independently be selected from optionally substituted $C_1$-$C_6$ alkyl, such as $C_1$-$C_6$ alkyl, e.g. methyl, ethyl or propyl, preferably methyl. In aspects, $R^3$ and $R^4$ are the same.

In that Z may comprise a combination of the above-mentioned groups, the invention encompasses photoinitiators in which Z is made up of two or more of the above-mentioned groups in series. In all of the above, the —($C_1$-$C_{12}$ alkylene)- and -aryl- groups may be substituted or unsubstituted. Other chemically-feasible structures for Z can be determined by the person skilled in the art.

Suitably, Z is selected from a single bond, $C_1$-$C_{12}$ alkylene, $C_1$-$C_{12}$ alkenylene; —O—; —S—; —NR$^a$—; and —[O—($C_1$-$C_{12}$ alkylene)]$_{n-}$, wherein R$^a$ is H or optionally substituted $C_1$-$C_{12}$ alkyl and n is an integer from 1-20. In aspects, Z is selected from a single bond, $C_1$-$C_{12}$ alkylene, and —O—($C_1$-$C_{12}$ alkylene)-, such as $C_1$-$C_6$ alkylene or —O—($C_1$-$C_6$ alkylene)-.

Similarly, Za may be selected from a single bond, $C_1$-$C_{12}$ alkylene, $C_1$-$C_{12}$ alkenylene; —O—; —S—; —NR$^a$—; and —[O—($C_1$-$C_{12}$ alkylene)]$_{n-}$, wherein R$^a$ is H or optionally substituted $C_1$-$C_{12}$ alkyl and n is an integer from 1-20. In aspects, Za is selected from a single bond, $C_1$-$C_{12}$ alkylene, and —O—($C_1$-$C_{12}$ alkylene)-, such as $C_1$-$C_6$ alkylene or —O—($C_1$-$C_6$ alkylene)-.

Units of formula (I) or (II) in which Z comprises an electron-donating group adjacent to Pi are advantageous, as this provides opportunities to tailor the UV absorption of the photoinitiator moiety.

Repeating units of particular interest have general formula (Ia) or (IIa):

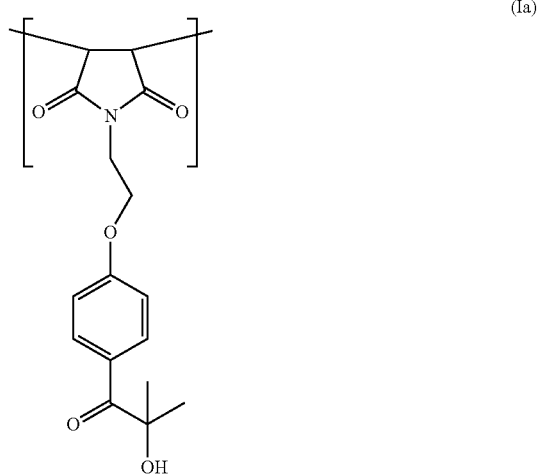

(Ia)

-continued

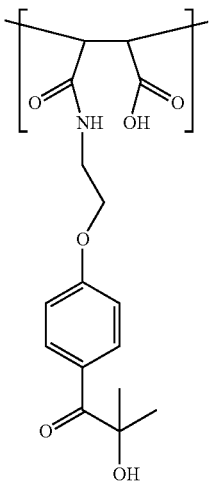

(IIa)

Polymer

The polymer may comprise one or more additional repeating units other than those of formulas (I) and (II).

In a particular aspect, the polymer may additionally comprise one or more units with formula (III) and/or one or more units with formula (IV):

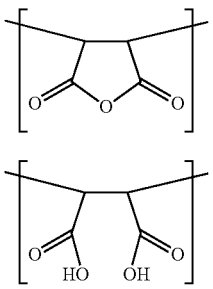

(III)

(IV)

According to this aspect, synthesis is simplified, as an amine can be reacted with a polymer of maleic acid anhydride (cf. synthesis below). Therefore, the polymer may comprising one or more units with formula (I), one or more units with formula (II), one or more units with formula (III) and one or more units with formula (IV).

The content of photoinitiator moieties in the polymer (the "loading") can be determined by the number of units having formula (I) or (II), as compared to the number of units having formula (III) or (IV). In mathematical terms, the ratio between said one or more units with formula (I): one or more units with formula (II): one or more units with formula (III): and one or more units with formula (IV) (I:II:III:IV) can be expressed as a:b:c:d. In this ratio, each of a, b, c and d are independently between 0 and 1, provided that a and b are not both 0, and wherein a+b+c+d=1.

Typically, the number of units with formula (I) or (II) in the polymer is lower than the number of units with formula (III) or (IV). This can be controlled during the synthesis, by introducing a predetermined amount of photoinitiator-amine which is less than the amount of amine which would be required to react stoichiometrically with all maleic anhydride units. In one aspect, a is between 0.01 and 0.1, preferably between 0.025 and 0.075. In another aspect, b is between 0.01 and 0.1, preferably between 0.025 and 0.075.

In addition to repeating units of formula I-IV, other repeating units may be present in the present polymer. The polymer may thus further comprise at least one additional repeating unit(s), said additional repeating unit(s) being an optionally-substituted C2-alkylene. These optionally-substituted C2-alkylene units have the structure (—CH—CH—) and may thus be optionally substituted at one or both C atoms. The optionally-substituted C2-alkylene units are the results of polymerisation of optionally-substituted alkenes.

The C2-alkylene units may be mono-substituted with a C1-C6 alkyl ether (e.g. methyl ether) or an aryl such as phenyl. A particularly suitable C2-alkylene unit is substituted with a methyl ether (and thus the product of co-polymerisation with methyl vinyl ether) or substituted with a phenyl group (and thus the product of co-polymerisation with styrene).

Commercially available polymers having an -A-B-A-B- structure can be obtained in which maleic acid anhydride monomer alternates with another monomer.

In such instances, the repeating units can be illustrated according to formula (i)-(iv) below:

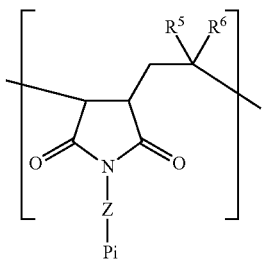

(i)

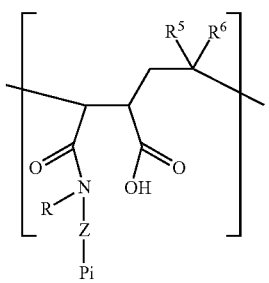

(ii)

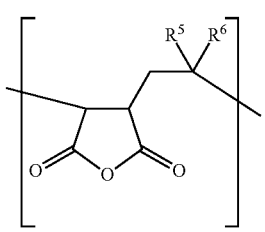

(iii)

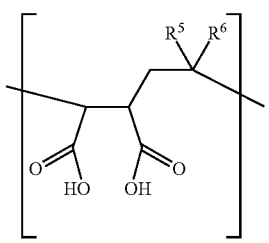

(iv)

The polymers described herein thus comprise at least one unit with formula (i) and at least one unit with formula (ii).

In formula (i)-(iv), $R^5$ and $R^6$ are independently selected from C1-C6 alkyl, C1-C6 alkyl ether (e.g. methyl ether) or aryl, e.g. phenyl.

When $R^5$=methyl, $R^6$=methyl the starting material for the synthesis described herein would be poly(isobutylene-alt-maleic anhydride).

When $R^5$=H, $R^6$=octadecyl the starting material for the synthesis described herein would be poly(maleic anhydride-alt-1-octadecene).

When $R^5$=H, $R^6$=H the starting material for the synthesis described herein would be poly(maleic anhydride-alt-ethylene).

When $R^5$=H, $R^6$=phenyl the starting material for the synthesis described herein would be poly(maleic anhydride-alt-styrene).

When $R^5$=H, $R^6$=OMe the starting material for the synthesis described herein would be poly(maleic anhydride-alt-methyl vinyl ether).

Synthesis

A method for synthesising a polymer according to the invention is also provided, said method comprising the steps of:

reacting an amine photoinitiator having the general formula (X)

H—N(R)—Z-Pi    (X)

where Z, R and Pi are as defined herein with reference to formula (I) and (II);
with a polymer comprising a maleic anhydride functionality;
such that a succinimide and/or amide moiety is formed between said maleic anhydride moiety and said primary amine; so as to provide said polymer comprising pendant photoinitiator moieties, wherein the photoinitiator moieties are bound to the polymer via the N-atom of the succinimide. Further details of this reaction are provided in relation to FIG. 1, and in the following examples.

SYNTHESIS EXAMPLES

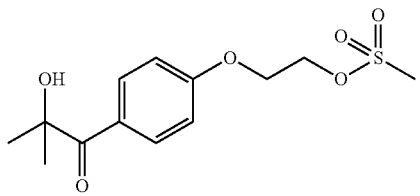 [SMILES: CC(C)(O)C(=O)c1ccc(OCCOS(C)(=O)=O)cc1]

2-[4-(2-Hydroxy-2-methylpropanoyl)phenoxy]ethyl methanesulfonate: Triethylamine (80.6 mL, 0.536 mol) was added to a solution of 2-hydroxy-1-[4-(2-hydroxyethoxy)phenyl]-2-methylpropan-1-one (80.0 g, 0.357 mol) in tetrahydrofuran (650 mL) at 0-5° C. Methanesulfonyl chloride (27.6 mL, 0.357 mol) was slowly added while maintaining the temperature at <15° C. The mixture was stirred at room temperature for 4 h. Water (400 mL), brine (200 mL) and tert-butyl methyl ether (500 mL) were added and the layers were separated. The aqueous layer was extracted with ethyl acetate (2×150 mL) and the combined organic phases were washed with brine (200 mL), dried (Na$_2$SO$_4$) and concentrated under reduced pressure to give the crude product. This was re-dissolved in ethyl acetate and filtered through a pad of silica to give the pure product as a colourless solid (106.6 g, 99%). $^1$H NMR (400 MHz, CDCl$_3$); 8.08 (d, J=8.8 Hz, 2H), 6.96 (d, J=8.8 Hz, 2H), 4.60 (t, J=4.4 Hz, 2H), 4.33 (t, J=4.4 Hz, 2H), 4.17 (s, 1H), 3.10 (s, 3H), 1.63 (s, 6H).

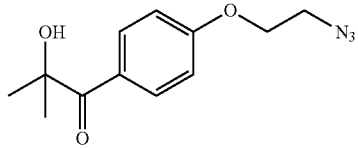 [SMILES: CC(C)(O)C(=O)c1ccc(OCCN=[N+]=[N-])cc1]

1-[4-(2-Azidoethoxy)phenyl]-2-hydroxy-2-methylpropan-1-one: Sodium azide (15.0 g, 0.231 mol) was added to a solution of 2-[4-(2-hydroxy-2-methylpropanoyl)phenoxy]ethyl methanesulfonate (70.0 g, 0.231 mol) in N,N-dimethylformamide (550 mL) at room temperature and the mixture was stirred at room temperature for 17 h, then was heated at 50° C. for 1.5 h. The mixture was stirred at room temperature for 16 h, then was heated at 60° C. for 6.5 h. The mixture was stirred at room temperature for a further 16 h then was heated at 75° C. for 7 h. After cooling the mixture to room temperature, water (600 mL) and tert-butyl methyl ether (600 mL) were added and the layers were separated. The aqueous phase was extracted with tert-butyl methyl ether (400 mL) and the combined organic phases was washed with water (2×500 mL) and brine (300 mL), dried (MgSO$_4$) and concentrated under reduced pressure to give the crude product (68.0 g, 118%, contaminated with N,N'-dimethylformamide), which was used in the next step without further purification. $^1$H NMR (400 MHz, CDCl$_3$); 8.08 (d, J=8.8 Hz, 2H), 6.97 (d, J=8.8 Hz, 2H), 4.23-4.21 (m, 3H), 3.65 (t, J=4.8 Hz, 2H), 1.64 (s, 6H).

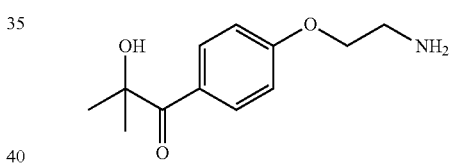

1-[4-(2-Aminoethoxy)phenyl]-2-hydroxy-2-methylpropan-1-one: Triphenylphosphine (76.5 g, 0.291 mol) was added to a solution of crude 1-[4-(2-azidoethoxy)phenyl]-2-hydroxy-2-methylpropan-1-one (68.0 g, 0.265 mol) in tetrahydrofuran (800 mL) and water (80 mL) and the solution was stirred at room temperature for 19 h. Water (40 mL) was added and the mixture was stirred at room temperature for a further 30 minutes. The mixture was concentrated under reduced pressure until approx. 200 mL liquid remained, and the remaining mixture was cooled in an ice bath. 20% Hydrochloric acid was added until the mixture was pH 0-1. Impurities were extracted into ethyl acetate (2×400 mL) and the organic washes were discarded. The aqueous phase was basified to pH 14 using 20% aqueous sodium hydroxide solution, then extracted with ethyl acetate (3×500 mL). The combined organic phases were washed with brine (200 mL), dried (Na$_2$SO$_4$) and concentrated under reduced pressure to give the product as a colourless liquid (51.3 g, 87%). A $^1$H NMR spectrum of the compound (400 MHz, CDCl$_3$) seemed to indicate the formation of complex mixtures of oligomers in solution, nevertheless the product was used in the next step without further purification.

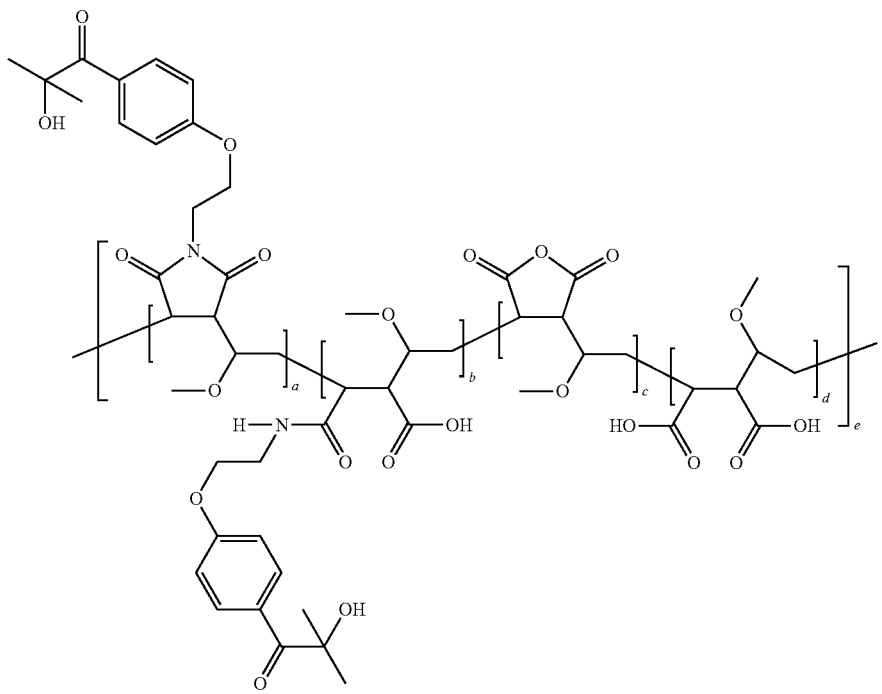

Functionalised Polymer: Poly(methyl vinyl ether-alt-maleic anhydride) (average $M_w$~216,000, average $M_n$~80,000, 1.0 kg) was slowly added to tetrahydrofuran (2.5 L) over ~5 h with stirring at room temperature. More tetrahydrofuran (800 mL) was added and stirring was continued for 18 h. A solution of 1-[4-(2-aminoethoxy)phenyl]-2-hydroxy-2-methylpropan-1-one (49.5 g, 0.222 mol) in tetrahydrofuran (250 mL) was added at room temperature over 1 h. The mixture was stirred at room temperature for 1 h then was heated at 50° C. for 4 h. Water (230 mL) was added and the mixture was heated at 65° C. for 7 h, then was stirred at room temperature for 16 h. The mixture was heated at 60° C. for 8 h then at 50° C. for 19 h. The mixture was allowed to cool to room temperature and was dried under vacuum at 55-60° C. for 24 h until all solvent was removed, giving the product as a pale yellow solid (1.17 Kg, 100%). $v_{max}/cm^{-1}$ 2940, 2887, 1705, 1219, 1174, 1096, 1043, 880, 658.

Although the invention has been described with reference to a number of examples and reaction schemes, it should not be considered as limited by the above description. The full scope of the invention is defined by the appended claims.

The invention claimed is:

1. A polymer comprising of one or more units of formula (I) and one or more units of formula (II):

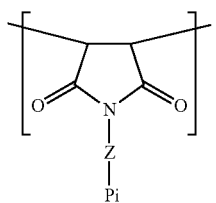

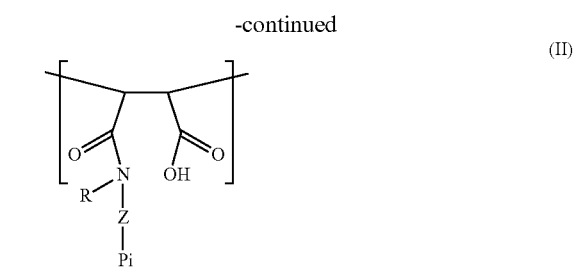

wherein:

Pi comprises a photoinitiator moiety;

R comprises a hydrogen atom or an optionally substituted $C_1$-$C_6$ alkyl or an optionally substituted $C_6$-$C_{10}$ aryl;

Z comprises a linker moiety comprising a single bond, optionally substituted $C_1$-$C_{12}$ alkylene, optionally substituted $C_1$-$C_{12}$ alkenylene, —O—, —S—, —NR$^a$—, —CO—NR$^a$—, optionally substituted heterocyclyl, optionally substituted arylene, optionally substituted —[O—($C_1$-$C_{12}$ alkylene)]$_{n-}$ optionally substituted —[S—($C_1$-$C_{12}$ alkylene)]$_{n-}$ and combinations thereof, wherein n is an integer from 1-20, and wherein R$^a$ comprises H or an optionally substituted $C_1$-$C_6$ alkyl.

2. The polymer according to claim 1, wherein Z comprises a single bond, $C_1$-$C_{12}$ alkylene, $C_1$-$C_{12}$ alkenylene, —O—, —S—, —NR$^a$—, or —[O—($C_1$-$C_{12}$ alkylene)]$_n$, wherein R$^a$ comprises H or an optionally substituted $C_1$-$C_{12}$ alkyl and n is an integer from 1-20.

3. The polymer according to claim 1, wherein Z comprises a single bond, $C_1$-$C_{12}$ alkylene, —O—($C_1$-$C_{12}$ alkylene)-, $C_1$-$C_6$ alkylene, or —O—($C_1$-$C_6$ alkylene)-.

4. The polymer according to claim 1, wherein Pi comprises a Norrish type-I photoinitiator moiety.

5. The polymer according to claim 1, wherein Pi comprises benzoin ethers, 1-phenyl-2-hydroxy-2-alkyl ketones, 1-phenyl-2-amino-2-alkyl ketones, dibenzosuberones, benzils, benzil ketals, acetophenones, α-alkoxy-acetophenones, α,α-dialkoxy-acetophenones, α-hydroxy-α-alkyl-phenones, α-hydroxy-α,α-dialkyl-phenones, alkyl phenylglyoxylates, camphorquinones, acyl-phosphine oxides, or phenyl keto-coumarins.

6. The polymer according to claim 1, wherein Pi comprises a photoinitiator comprising acetophenones, α-alkoxy-acetophenones, α,α-dialkoxy-acetophenones, α-hydroxy-α-alkyl-phenones, α-hydroxy-α,α-dialkyl-phenones, or alkyl phenylglyoxylates.

7. A polymer according to claim 1, wherein Pi comprises a Norrish Type-I photoinitiator moiety comprising formula (V):

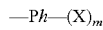
(V)

wherein Ph comprises an optionally-substituted phenyl ring;

wherein m is an integer of 1-5, such that m X moieties may be present at any position on Ph; and wherein X comprises one of:

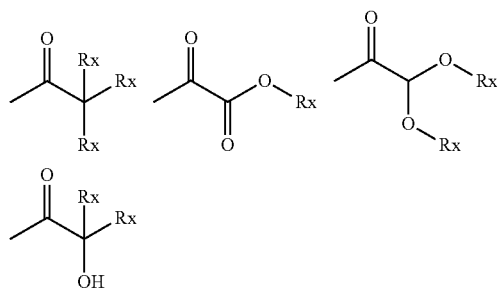

wherein each Rx comprises H or an optionally substituted $C_1$-$C_6$ alkyl.

8. The polymer according to claim 7, wherein the X is present at the para-position on the Ph.

9. The polymer according to claim 7, wherein m is 1 or 2.

10. The polymer according to claim 1, wherein the one or more units (I) and (II) comprise formulae (Ia) and (IIa):

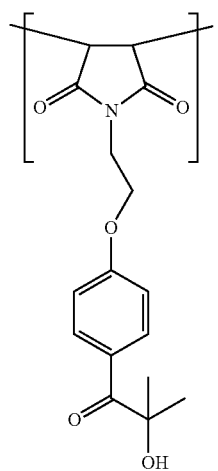
(Ia)

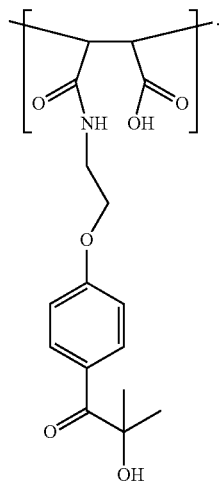
(IIa)

11. The polymer according to claim 1, further comprising of one or more units with formula (III) and/or one or more units with formula (IV):

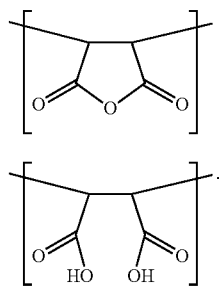
(III)

(IV)

12. The polymer according to claim 11, further comprising of one or more units with formula (I), one or more units with formula (II), one or more units with formula (III) and one or more units with formula (IV).

13. The polymer according to claim 12, wherein the ratio between the one or more units with formula (I): one or more units with formula (II): one or more units with formula (III): and one or more units with formula (IV) (I:II:III:IV) is expressed as a:b:c:d, wherein each of a, b, c and d are each independently between 0 and 1, wherein a +b+c +d=1.

14. The polymer according to claim 12, wherein a is between 0.01 and 0.1.

15. The polymer according to claim 12, wherein b is between 0.01 and 0.1.

16. The polymer according to claim 1, further comprising at least one additional repeat unit(s), the additional repeat unit(s) comprising an optionally-substituted $C_2$-alkylene.

17. The polymer according to claim 16, wherein the $C_2$-alkylene is mono-substituted with a $C_1$-$C_6$ alkyl ether or an aryl.

18. The polymer according to claim 11, further comprising at least one additional repeat unit(s), the additional repeat unit(s) comprising an optionally-substituted $C_2$-alkylene.

19. The polymer according to claim 18, wherein the $C_2$-alkylene is mono-substituted with a $C_1$-$C_6$ alkyl ether or an aryl.

20. The polymer according to claim 12, further comprising at least one additional repeat unit(s), the additional repeat unit(s) comprising an optionally-substituted $C_2$-alkylene.

21. The polymer according to claim 20, wherein the $C_2$-alkylene is mono-substituted with a $C_1$-$C_6$ alkyl ether or an aryl.

22. The polymer according to claim 10, further comprising one or more units with formula (Ia), one or more units with formula (IIa), one or more units with formula (III) and/or one or more units with formula (IV):

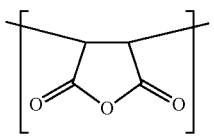
(III)

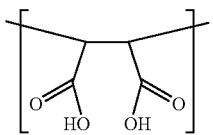
(IV)

23. The polymer according to claim 22, wherein the ratio between the one or more units with formula (Ia): one or more units with formula (IIa): one or more units with formula (III): and one or more units with formula (IV) (Ia:IIa:III:IV) is expressed as a:b:c:d, wherein each of a, b, c and d are independently between 0 and 1, provided that a and b are not both 0, and wherein a+b+c+d=1.

24. The polymer according to claim 22, wherein a is between 0.01 and 0.1.

25. The polymer according to claim 22, wherein b is between 0.01 and 0.1.

26. The polymer according to claim 22, further comprising at least one additional repeat unit(s), the additional repeat unit(s) comprising an optionally-substituted $C_2$-alkylene.

27. The polymer according to claim 26, wherein the $C_2$-alkylene is mono-substituted with a $C_1$-$C_6$ alkyl ether or an aryl.

28. A method for synthesizing a polymer according to claim 1, the method comprising the steps of: reacting an amine photoinitiator comprising formula (X)

$$H\text{—}N(R)\text{—}Z\text{-Pi} \qquad (X)$$

wherein Z, R and Pi are as previously defined;
with a polymer comprising a maleic anhydride functionality;
such that a succinimide and amide moiety is formed between the maleic anhydride moiety and the primary amine so as to provide the polymer comprising pendant photoinitiator moieties, wherein the photoinitiator moieties are bound to the polymer via the N-atom of the succinimide.

* * * * *

UNITED STATES PATENT AND TRADEMARK OFFICE
CERTIFICATE OF CORRECTION

PATENT NO. : 11,034,779 B2
APPLICATION NO. : 16/639134
DATED : June 15, 2021
INVENTOR(S) : Høj et al.

Page 1 of 1

It is certified that error appears in the above-identified patent and that said Letters Patent is hereby corrected as shown below:

In the Specification

In Column 4, Line 22, delete "succimimide" and insert -- succinimide --, therefor.

In the Claims

In Column 11, Line 55, in Claim 1, delete "comprising of" and insert -- comprising --, therefor.

In Column 12, Line 51, in Claim 1, delete "-[O-($C_1$-$C_{12}$ alkylene)]$_n$-" and insert -- -[O-($C_1$-$C_{12}$ alkylene)]$_n$-, --, therefor.

In Column 12, Line 57, in Claim 2, delete "-[O-($C_1$-$C_{12}$ alkylene)]$_n$," and insert -- -[O-($C_1$-$C_{12}$ alkylene)]$_n$-, --, therefor.

In Column 14, Lines 22-23, in Claim 11, delete "comprising of" and insert -- comprising --, therefor.

In Column 14, Lines 40-41, in Claim 12, delete "comprising of" and insert -- comprising --, therefor.

In Column 16, Line 17, in Claim 28, delete "formula(X)" and insert -- formula (X): --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*